May 1, 1956     H. A. TOULMIN, JR     2,744,044
LAMINAR PRODUCT AND METHOD OF MAKING THE SAME
Filed June 18, 1953
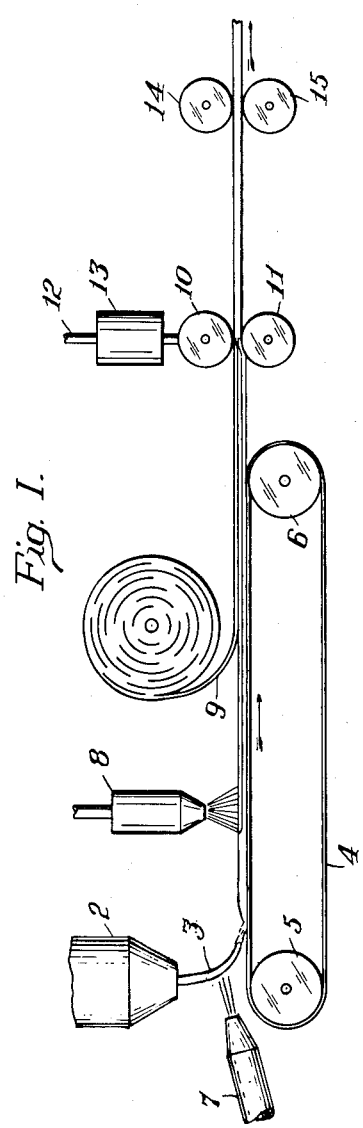
Fig. I.
Fig. II.
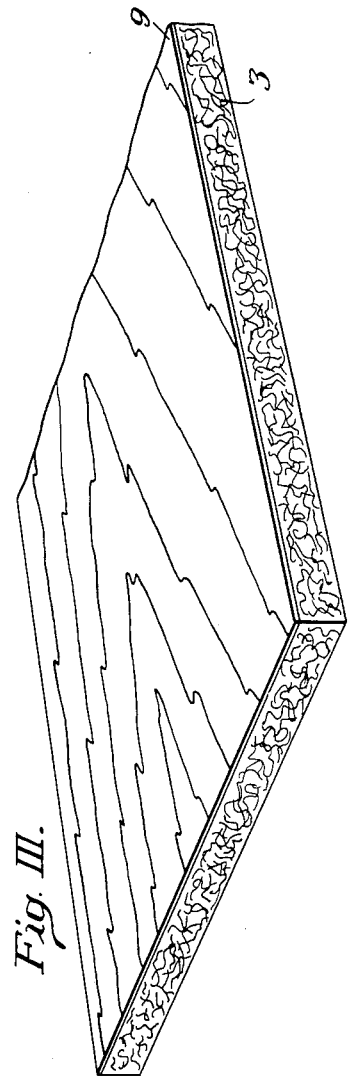
Fig. III.
INVENTOR.
Harry A. Toulmin, Jr.
BY Toulmin & Toulmin
ATTORNEYS

United States Patent Office 2,744,044
Patented May 1, 1956

2,744,044

LAMINAR PRODUCT AND METHOD OF MAKING THE SAME

Harry A. Toulmin, Jr., Dayton, Ohio, assignor to Midland Chemical Corporation, Dayton, Ohio, a corporation of Delaware Application June 18, 1953, Serial No. 362,613

18 Claims. (Cl. 154—101)

This invention relates to a laminated or composite product useful as building material, and to a method for making the same.

There is a need in the art for a strong, decorative building material that is comparatively inexpensive, fireproof, soundproof, vermin proof, and strong enough for mechanical working.

The primary object of this invention is to provide such a building material.

The building material of the invention consists of a layer of veneer or the like locked to a support comprising glass fibers by a novel, thermoset polyester or alkyd resin which is also a binder for the glass fibers.

The invention will be understood from the following description, taken with the attached drawing, in which Figure I is an illustration substantially in diagrammatic form of apparatus which may be used in making the laminate of the invention;

Figure II is a fragmentary end view of the laminate; and

Figure III is a view in perspective of the laminate.

Referring more particularly to Fig. I, there is shown a hopper 2 from which the glass fibers 3 are fed onto the endless conveyor belt 4 supported on the rollers 5 and 6 driven by any suitable means (not shown) and rotating in the direction of the arrows.

The fibers leaving the hopper are impregnated with a liquid polymerizable composition comprising a blend of a partially condensed modified or unmodified polyester and a vinyl-substituted heterocyclic tertiary amine by means of the spray-gun 7, and after falling on the conveyor belt are carried past the spray gun 8 and again sprayed with the polymerizable composition. A strip of veneer 9 is deposited on top of the impregnated fibers from the supply roll and the resulting assembly is passed between the pair of rolls 10 and 11, which may be heated by any appropriate means (not shown), to convert the polymerizable composition to the hardened thermoset condition. Piston 12, reciprocating in cylinder 13, is arranged to exert pressure on roll 10, to compress the product into a board of the desired thinness and bring the fibers and veneer into intimate contact with the binder while simultaneously hardening the resin, to lock the glass fibers to each other and to the ply of veneer. From the rolls 10, 11, the compressed board or board-like laminate may be advanced by forwarding rolls 14, 15 to a stage at which it is subjected to various operations to adapt it for its ultimate use.

The polyester component of the polymerizable composition which is applied to the glass fibers in making the laminates is an alkyd resin precondensate.

The term "alkyd resin" as used herein includes unmodified and modified polyhydric alcohol polyesters of alpha-unsaturated-alpha, beta-polycarboxylic acids. As typical of the polyhydric alcohols used in making the partial condensates may be mentioned ethylene glycol, di-, tri-, and tetra-ethylene glycol, propylene glycol, dipropylene glycol, tri-methyleneglycol, glycerol and pentaerythritol. Examples of the alpha-unsaturated-alpha, beta-polycarboxylic acids are maleic, fumaric, chlormaleic, chlorofumaric, citraconic, methylethyl maleic, diethyl maleic, chloromethyl maleic and mesaconic acids. The unmodified partially condensed polyester to be blended with the vinyl-substituted heterocyclic tertiary amine may be made by heating one or more of the foregoing alcohols with a roughly equivalent proportion of one of more of the acids, their anhydrides, or compounds which liberate the acids, for a time sufficient to effect condensation to the stage at which the condensate occurs as a resinous liquid.

The modified partially condensed polyester or alkyd resin to be blended with the vinyl-substituted heterocyclic tertiary amine may be made in the manner described above except that a part, or even nearly all, of the unsaturated polycarboxylic acid is substituted by saturated mono- or poly-carboxylic acids or their anhydrides, such as succinic, adipic, phthalic, sebacic or 12-hydroxystearic acids, or tetrahydro phthalic anhydride. Monobasic acids containing from 10 to 20 carbon atoms may be preferred. These acids may be mixed fatty acids derived from vegetable oils or the individual acids which occur therein. The vegetable oils themselves may be incorporated by conventional methods, for example by the so-called "alcoholysis" method. As examples of the vegetable oils there may be mentioned linseed oil, perilla oil, soybean oil, caster oil, dehydrated castor oil, palm kernel oil, cocoanut oil, and the like.

The alkyd resin precondensates, both of the unmodified and modified types, are known in the art and are available commercially under a variety of trade-names.

The alkyd or polyester resin is made up of repeated groupings containing alcohol and acid units and may have a molecular weight, as measured by the acid value of the resin, of over 500, molecular weights of 1000 or over being generally preferred. The molecular weight should be such that the resinous liquid is capable of being blended uniformly with the vinyl-substituted heterocyclic tertiary amine in conventional-type mixing apparatus.

Examples of the vinyl-substituted heterocyclic tertiary amines which may be used include the vinyl pyridines, for instance, 2-vinylpyridine, 5-vinyl-2-methylpyridine, 5-ethyl-2-vinylpyridine, and the vinylpyridines and their alkyl nuclearly substituted derivatives generally in which the alkyl radicals contain from 1 to 4 carbon atoms, the vinylimidazoles, the vinylquinolines, the vinyl-isoquinolines, the vinylthiazoles, the vinyl oxazoles, the vinyl benzo-oxazoles, etc.

The polymerizable composition for impregnating the glass fiber mass may be obtained by mixing or blending the monomeric or at least still polymerizable vinyl-substituted heterocyclic tertiary amine and polyester in the appropriate proportions.

The vinyl-substituted amine functions, initially, as a diluent for the polyester and subsequently, on heating of the mix to curing temperature, as a cross-linking agent therefor. The eventual hardening to thermoset condition and simultaneous cross-linking of the polyester chains by the vinyl-substituted amine, with polymerization of the latter, are best accomplished in the presence of the catalyst. A latent catalyst may be incorporated in the mix during the initial blending, or a catalyst may be mixed with the blend immediately prior to use thereof. Particularly preferred for this purpose are organic peroxides such as benzoyl peroxide, succinic peroxide, and especially peroxides made from fatty acids having from 10–20 carbon atoms, including lauroyl peroxide, stearoyl peroxides and the peroxides made from vegetable oil acids such as cocoanut oil peroxides. Alcohol peroxides such as tertiary butyl hydroperoxide and terpene oxides, e. g., ascaridole, may also be used. Normally, the catalyst may be used in very small amounts of from 1.1% to about 2% of the blend by weight.

The relative proportions of the polyester and amine in the blend may be varied widely. Satisfactory compositions may comprise from 5 to 50 parts of the vinyl-substituted heterocyclic tertiary amine, e. g., a vinylpyridine such as 2-vinylpyridine or 5-vinyl-2-methylpyridine, for each 100 parts of the polyester.

Specific blends which may be used, and preferred, as the resinous binder for the laminates may comprise the selected polymerizable vinyl-substituted heterocyclic tertiary amine and a polyester obtained from the glycol, e. g., propylene glycol, and a mixture of an unsaturated dicarboxylic acid and a saturated dicarboxylic acid, or the acid anhydrides, e. g., a mixture of maleic acid and phthalic acid, or of maleic anhydride and phthalic anhydride, particularly the polyesters from mixtures of the two acid types in which the molecular ratio of saturated acid to unsaturated acid is not greater than 60:40. The acid mixtures may desirably comprise the acids in such proportions that the molecular ratio of saturated acid to unsaturated acid is 10:90, 25:75, or 50:50. Polyesters formed from mixed unsaturated and saturated acids in which the saturated acid is phthalic acid are especially useful, in some instances.

The polyester component of the blend may be further modified by including with the polyester-forming constituents an alcohol having a terminal $CH_2=C$ group, including allyl alcohol and others of that class having from 3 to 10 carbon atoms. This includes methallyl alcohol, methyl vinyl carbinol, allyl carbinol, beta-allyl ethyl alcohol, monoallyl and monomethallyl ethers of ethylene glycol and the like. Such modified polyesters are known and contain, in addition to the acid and polyhydric alcohol residues, residues of the unsaturated alcohol.

The polyester may also be one produced in the presence of a monohydric aliphatic alcohol such as 1-butanol, and other saturated lower aliphatic alcohols having straight or branched chains, particularly alcohols having 3–6 carbon atoms such as propanol, 1-pentanol, 2-methyl-1-butanol, 2-pentanol, 2-methyl-2-butanol, 2-propanol, 2-butanol, 2-methyl-2-propanol and the like. The final polyester may, therefore, also contain residues of the saturated monohydric alcohol, preferably in an amount up to 1–10% of the total ester linkages.

One of the distinguishing features of the blends of this invention is that the vinyl-substituted heterocyclic tertiary amines are strongly receptive of the acid dyestuffs which permits coloring of the blend as a whole by such dyes as a result of the occurrence of the vinyl-substituted tertiary amine homogeneously throughout the blend, and without the addition of dyes to the blend during mixing thereof. Various dyes and pigments may be incorporated, if desired, however.

It is to be noted that although the polyester component may be prepared by reacting substantially equivalent parts of the polyhydric alcohol and polycarboxylic acid, variations in the properties of the polyesters may be achieved not only by conducting the esterification reaction in the presence of unsaturated allyl-type alcohols and/or saturated monohydric alcohols, but also by variations in the relative proportions of the reactants so that there is a slight preponderance of either the polycarboxylic acid or the polyhydric alcohol.

The following examples illustrate specific polymerizable blends which may be used in making the new laminates.

*Example I*

A modified unsaturated resinous polyester resin was prepared by heating a mixture of 0.5 mol. (49 parts) maleic anhydride, 0.5 mol. (74 parts) phthalic anhydride and 1.2 mol. (92 parts) of propylene glycol to 190° C. until a clear resinous liquid was obtained.

A sufficient amount of monomeric 2-vinylpyridine was mixed, at room temperature, with the resinous polyester to obtain a mass comprising, on a weight basis, the equivalent of 40 parts of the vinylpyridine per each 100 parts of polyester.

*Example II*

An unmodified resinous polyester was prepared by heating together equimolecular proportions of triethylene glycol and maleic acid until a partial condensate having the form of a resinous liquid was obtained.

The polyester was mixed, at room temperature, with a sufficient amount of 5-vinyl-2-methylpyridine to produce a blend containing the equivalent, on the weight basis, of about 15 parts of the 5-vinyl-2-methyl-pyridine per 100 parts of the polyester.

*Example III*

A modified resinous polyester was prepared by heating a mixture of ingredients as in Example I. The resin was blended with 2-vinyl pyridine containing 1% by weight of hydroquinone to obtain a homogeneous mix containing 30 parts of the vinylpyridine per 100 parts of polyester.

All of the blends exemplified are clear, liquid readily sprayable but viscous materials.

Using apparatus as shown in Fig. I of the drawing, these blends are sprayed on the mass of glass fibers or on one or more layers of glass fabric, the strip of veneer is laid down on the resin-impregnated fibers, and the assembly is passed between rollers 10 and 11 and simultaneously heated and compressed to obtain a hard but flexible flameproof, soundproof, moisture- and vermin-resistant laminate which withstands mechanical working and can be sawed, turned, nailed, screwed, or hung on hooks in building frames or metal lathes, and which is free from the disadvantages that normally reduce the life of conventional building materials, such as warping, condensation of moisture, etc.

The conveyor on which the fibers are deposited, and the press rolls 10, 11 are preferably formed of a material such as rubber or metal, to which the product does not tend to adhere before hardening of the polymerizable blend or during heating and pressing thereof.

The temperature to which the assembly is heated as it passes between rollers 10, 11 may vary but, in general, it is desirable to employ temperatures between 50° C. and 200° C., the higher temperatures having the advantage of bringing the resin to the thermoset condition in a shorter time. In many instances, temperatures between about 70° C. and 125° C. are found advantageous.

One of the advantages of the invention is that, generally speaking, the blend of polymerizable polyester and vinyl-substituted heterocyclic tertiary amine can be cured to the insoluble, infusible state at comparatively low pressures. In some cases, atmospheric pressure may be sufficient although usually a pressure of at least 0.5 lb./sq. in. above atmospheric is desirable. The most suitable pressure depends, to an extent, on the proportion of binder in the product. From 15 to 20 lbs./sq. in. (gauge) may be satisfactory when the weight of the resin is above 35% on the weight of the glass fibers, whereas higher pressures may be used in making laminates which contain lower proportions of the binder, such as 300–500 lbs./sq. in. for products containing, before the application of the heat and pressure, around 20–25% of the polymerizable blend. In general, the blend may be used in amounts between about 15% and 50% on the fiber weight.

Various modifications may be made in the details exemplified. Thus, the vinylpyridines illustrated may be replaced by other vinyl-substituted heterocyclic tertiary amines or their nuclearly substituted alkyl derivatives. For special purposes, there may be used, in place or in addition to the vinyl-substituted heterocyclic tertiary amines per se, copolymers thereof with other, preferably polyolefinic, monomers such as butadienes.

Instead of employing the heated rollers 10, 11, heated platens may be used for simultaneously hardening the blend and compressing the product. Also, it is within the scope of the invention to heat the product, after deposition of the veneer strip on the glass fibers in one operation and in any suitable way, as by means of hot air or by induction or radiant heating, and then subject the product to pressure while it is hot and before the resin is thermoset to final hardened condition.

As shown in the drawing, it is preferred to apply the resinous polymerizable blend to the glass fibers falling from the feeding hopper onto the conveyor belt by means of a suitable spray gun supported to project the resinous composition upwardly against the fibers which, in the final product, occur at the bottom of the glass fiber stratum, and to project an additional amount of the binder downwardly against the fibers disposed on the conveyor to insure that, in the final laminate the non-brittle resin binder is distributed throughout the cross-section of the glass fiber stratum and also occurs as a more or less continuous layer between the glass fibers and the veneer overlay, so that contiguous fibers at all portions of the glass stratum are bonded to each other through the resin and the veneer overlay is permanently locked to the fiber stratum at the surface thereof through the resin.

The reinforcing layer or stratum comprising the mass of resin bonded discontinuous glass fibers is characterized by high strength in all directions as a result not only of the bonded condition of the fibers but also because the fibers are disposed in disarrayed, haphazard, non-parallelized condition.

In addition to being highly useful as building material, such as decorative panelling or the like, the laminates having a surface ply of veneer locked to the supporting mass of haphazardly arrayed bonded glass fibers may be used for other purposes for which a strong, reinforced soundproof, fireproof and verminproof structure have a decorative surface is desirable, such as in the manufacture of veneered cabinetwork and veneered furniture of all types and may find wide usage in fancy reproductions of the antique and classic period, as well as in the manufacture of inlaid articles such as boxes, plaques, trays, etc. The veneer may be of any suitable wood. For instance, a thin veneer of mahogany may be locked to the glass fibers by the polyester resin to obtain a strong laminate suitable for use as panelling having the rope, mottle, raindrop, broken stripe or blister pattern present in the best mahogany stocks, but which is comparatively inexpensive.

Instead of veneer, a decorative paper, glassine, fabric and preferably a fabric formed of glass fibers, may be deposited on a mass of discontinuous glass fibers which has been treated with the polymerizable blend, the whole being then subjected to heat and pressure to obtain a laminate having a decorative surface stratum locked to the supporting web of resin-bonded discontinuous glass fibers and useful as a substitute for conventional plywood. Or the decorative paper, glassine, etc. may be locked to one or more layers of glass fabric impregnated with the blend and locked to the surface layer by the thermoset blend.

While emphasis has been placed on discontinuous glass fibers bonded by the thermoset polyester resin to form a web-like support or backing for the top ply having a decorative surface, the top ply may be locked to a glass fabric layer or to a plurality of glass fabric layers, the fibers of the fabric, and the adjacent fabric layers, being bonded together by the insoluble, infusible polyester resin.

The invention has the advantage that, because the polymerizable blends can be cured under pressures varying from very low pressures to high pressures, depending on the proportion of blend therein, the products may be compressed to any desired thinness without interfering with thorough curing and hardening of the blend.

Since the invention is susceptible of the last-mentioned and other modifications which come within the scope of the disclosure and of the appended claims, it will be understood that it is not intended to limit or circumscribe the invention by the specific details given.

I claim:

1. A thin, compressed laminar structure for use as building material and the like, consisting of a top stratum having a decorative exposed surface and locked, by an initially liquid blend of a reactive resinous condensation product of a polyhydric alcohol and a polycarboxylic acid with from 5 to 50 parts by weight of a vinyl-substituted heterocyclic tertiary amine per 100 parts of the condensation product, to a reinforcing and supporting stratum of glass fibers in which contiguous fibers are bonded together by the hardened blend, said blend being distributed through the glass fiber stratum and disposed at the surface thereof between the strata.

2. A thin, compressed laminar structure for use as building material and the like, consisting of a top stratum having a decorative exposed surface and locked, by a hardened, initially liquid blend of a reactive, resinous condensation product of a polyhydric alcohol and a polycarboxylic acid with from 5 to 50 parts by weight of a vinylpyridine per 100 parts of the condensation product, to a reinforcing and supporting stratum of glass fibers in which contiguous fibers are bonded together by the blend, said blend being distributed through the glass fiber stratum and disposed at the surface thereof between the strata.

3. A thin, compressed laminar structure for use as building material and the like, consisting of a top stratum having a decorative exposed surface and locked, by a hardened, initially liquid blend of a reactive, resinous condensation product of a polyhydric alcohol and a polycarboxylic acid with from 5 to 50 parts by weight of a 2-vinylpyridine per 100 parts of said condensation product, to a reinforcing and supporting stratum of glass fibers in which contiguous fibers are bonded together by the blend, said blend being distributed through the glass fiber stratum and disposed at the surface thereof between the strata.

4. A thin, compressed laminar structure for use as building material and the like, consisting of a top stratum having a decorative exposed surface and locked, by a hardened, initially liquid blend of a reactive, resinous condensation product of a polyhydric alcohol and a polycarboxylic acid with 5 to 50 parts by weight of 4-vinyl-2-methylpyridine per 100 parts of said condensation product, to a reinforcing and supporting stratum of glass fibers in which contiguous fibers are bonded together by the blend, said blend being distributed through the glass fiber stratum and disposed at the surface thereof between the strata.

5. A thin, compressed laminar structure for use as building material and the like, consisting of a top stratum having a decorative exposed surface and locked, by a hardened, initially liquid blend of a reactive, resinous condensation product of a polyhydric alcohol and a polycarboxylic acid with 5 to 50 parts by weight of 5-ethyl-2-vinylpyridine per 100 parts of said condensation product, to a reinforcing and supporting stratum of glass fibers in which contiguous fibers are bonded together by the blend, said blend being distributed through the glass fiber stratum and disposed at the surface thereof between the strata.

6. A compressed laminar structure for use as building material and the like, consisting of a mass of discontinuous, haphazardly arrayed glass fibers, contiguous fibers in the mass being bonded together by a hardened, initially liquid blend of a reactive, resinous condensation product of a polyhydric alcohol and a polycarboxylic acid with 5 to 50 parts by weight of a vinyl-substituted heterocyclic tertiary amine per 100 parts of said condensation product, and a ply of veneer locked to one surface of the glass fiber mass by the hardened blend.

7. A compressed laminar structure for use as building material and the like, consisting of a mass of discontinuous, haphazardly arrayed glass fibers, contiguous fibers in the mass being bonded together by a hardened, initially liquid blend of a reactive, resinous condensation product of a polyhydric alcohol and a polycarboxylic acid with 5 to 50 parts by weight of a vinylpyridine per 100 parts of said condensation product, and a ply of veneer locked to one surface of the glass fiber mass by the hardened blend.

8. A compressed laminar structure for use as building material and the like, consisting of a mass of discontinuous, haphazardly arrayed glass fibers, contiguous fibers in the mass being bonded together by a hardened, initially liquid blend of a reactive, resinous condensation product of a polyhydric alcohol and a polycarboxylic acid with 5 to 50 parts by weight of a 2-vinylpyridine per 100 parts of the condensation product, and a ply of veneer locked to one surface of the glass fiber mass by the hardened blend.

9. A compressed laminar structure for use as building material and the like, consisting of a mass of discontinuous, haphazardly arrayed glass fibers, contiguous fibers in the mass being bonded together by a hardened, initially liquid blend of a reactive, resinous condensation product of a polyhydric alcohol and a polycarboxylic acid with 5 to 50 parts by weight of 4-vinyl-2-methylpyridine per 100 parts of said condensation product, and a ply of veneer locked to one surface of the glass fiber mass by the hardened blend.

10. A compressed laminar structure for use as building material and the like, consisting of a mass of discontinuous, haphazardly arrayed glass fibers, contiguous fibers in the mass being bonded together by a hardened, initially liquid blend of a reactive, resinous condensation product of a polyhydric alcohol and a polycarboxylic acid with 5 to 50 parts by weight of 5-ethyl-2-vinylpyridine per 100 parts of said condensation product, and a ply of veneer locked to one surface of the glass fiber mass by the hardened blend.

11. A compressed laminar structure for use as building material and the like, consisting of a ply of veneer locked, by a hardened, initially liquid blend of a reactive, resinous polyester containing only the residues of maleic acid, phthalic acid and propylene glycol with 5 to 50 parts by weight of a vinyl-substituted heterocyclic tertiary amine per 100 parts of said polyester, to a mass of discontinuous, haphazardly arrayed glass fibers contiguous fibers of which mass are bonded together by the hardened blend, said blend being distributed through the glass fiber mass and disposed at the surface thereof between said mass and the veneer ply.

12. A compressed laminar structure for use as building material and the like, consisting of a ply of veneer locked, by a hardened, initially liquid blend of a reactive, resinous polyester containing only the residues of maleic acid, phthalic acid and propylene glycol with 5 to 50 parts by weight of a vinylpyridine per 100 parts of said polyester, to a mass of discontinuous, haphazardly arrayed glass fibers contiguous fibers of which mass are bonded together by the hardened blend, said blend being distributed through the glass fiber mass and disposed at the surface thereof between said mass and the veneer ply.

13. A compressed laminar structure for use as building material and the like, consisting of a ply of veneer locked, by a hardened, initially liquid blend of a reactive, resinous polyester containing only the residues of maleic acid, phthalic acid and propylene glycol with 5 to 50 parts by weight of a 2-vinylpyridine per 100 parts of said polyester, to a mass of discontinuous, haphazardly arrayed glass fibers contiguous fibers of which mass are bonded together by the hardened blend, said blend being distributed through said glass fiber mass and disposed at the surface thereof between said mass and the veneer ply.

14. A compressed laminar structure consisting of paper having a decorative exposed surface locked, by a hardened, initially liquid blend of a reactive, resinous condensation product of a polyhydric alcohol and a polycarboxylic acid with 5 to 50 parts by weight of a vinyl-substituted heterocyclic tertiary amine per 100 parts of said polyester, to one surface of a glass fiber reinforcement contiguous fibers in which are bonded together by the hardened blend, said blend being distributed through the glass fiber reinforcement and disposed at the surface thereof between the reinforcement and the paper.

15. A compressed laminar structure consisting of fabric having a decorative exposed surface locked, by a hardened, initially liquid blend of a reactive, resinous condensation product of a polyhydric alcohol and a polycarboxylic acid with 5 to 50 parts by weight of a vinyl-substituted heterocyclic tertiary amine per 100 parts of said condensation product, to a glass fiber reinforcement, contiguous fibers in which are bonded together by the hardened blend, said blend being distributed through the glass fiber reinforcement and disposed at the surface thereof between the reinforcement and the fabric.

16. A method of making laminar structures which comprises depositing discontinuous glass fibers on a collecting surface, spraying the fibers with a liquid resinous blend of a reactive, resinous condensation product of a polyhydric alcohol and a polycarboxylic acid and from 5 to 50 parts by weight of a vinyl-substituted heterocyclic tertiary amine per 100 parts of said condensation product immediately before they come to rest on the collecting surface, and advancing the collecting surface in a predetermined path along which, successively, the fibers deposited thereon are sprayed with the blend, a ply having a decorative surface is deposited on the fibers comprising the blend, with its decorative surface exposed, and the assembly is subjected to heat and pressure to convert the blend to hardened insoluble, infusible condition and obtain a compressed laminar structure in which at least some of the contiguous glass fibers are bonded together by, and the top ply is locked to the glass fiber stratum through, the hardened blend.

17. A method as in claim 16 in which the assembly comprising the glass fibers and top ply is subjected to heat and pressure simultaneously.

18. A method of making a laminar structure for use as building material and the like, which comprises discharging discontinuous glass fibers onto a collecting surface, spraying the fibers with a liquid resinous blend of a reactive resinous condensation product of a polyhydric alcohol and a polycarboxylic acid and from 5 to 50 parts by weight of a vinyl-substituted heterocyclic tertiary amine per 100 parts of said condensation product before they come to rest on the collecting surface, and moving the collecting surface in a predetermined path along which, successively, the fibers are sprayed with the resinous liquid blend, a veneer ply is deposited on the fibers, and the assembly is subjected, simultaneously, to heat and pressure to convert the blend to hardened, infusible, insoluble condition and obtain a compressed product in which contiguous glass fibers are bonded by, and the veneer ply is locked to the glass fibers through, the hardened blend.

References Cited in the file of this patent
UNITED STATES PATENTS

| | | |
|---|---|---|
| 2,054,869 | Smolak | Sept. 22, 1936 |
| 2,577,205 | Meyer et al. | Dec. 4, 1951 |
| 2,598,663 | Kropa | June 3, 1952 |
| 2,600,457 | Wynstra | June 17, 1952 |
| 2,602,037 | Nelb | July 1, 1952 |
| 2,637,673 | Barnard | May 5, 1953 |
| 2,644,781 | Smolak et al. | July 7, 1953 |